Patented July 4, 1933

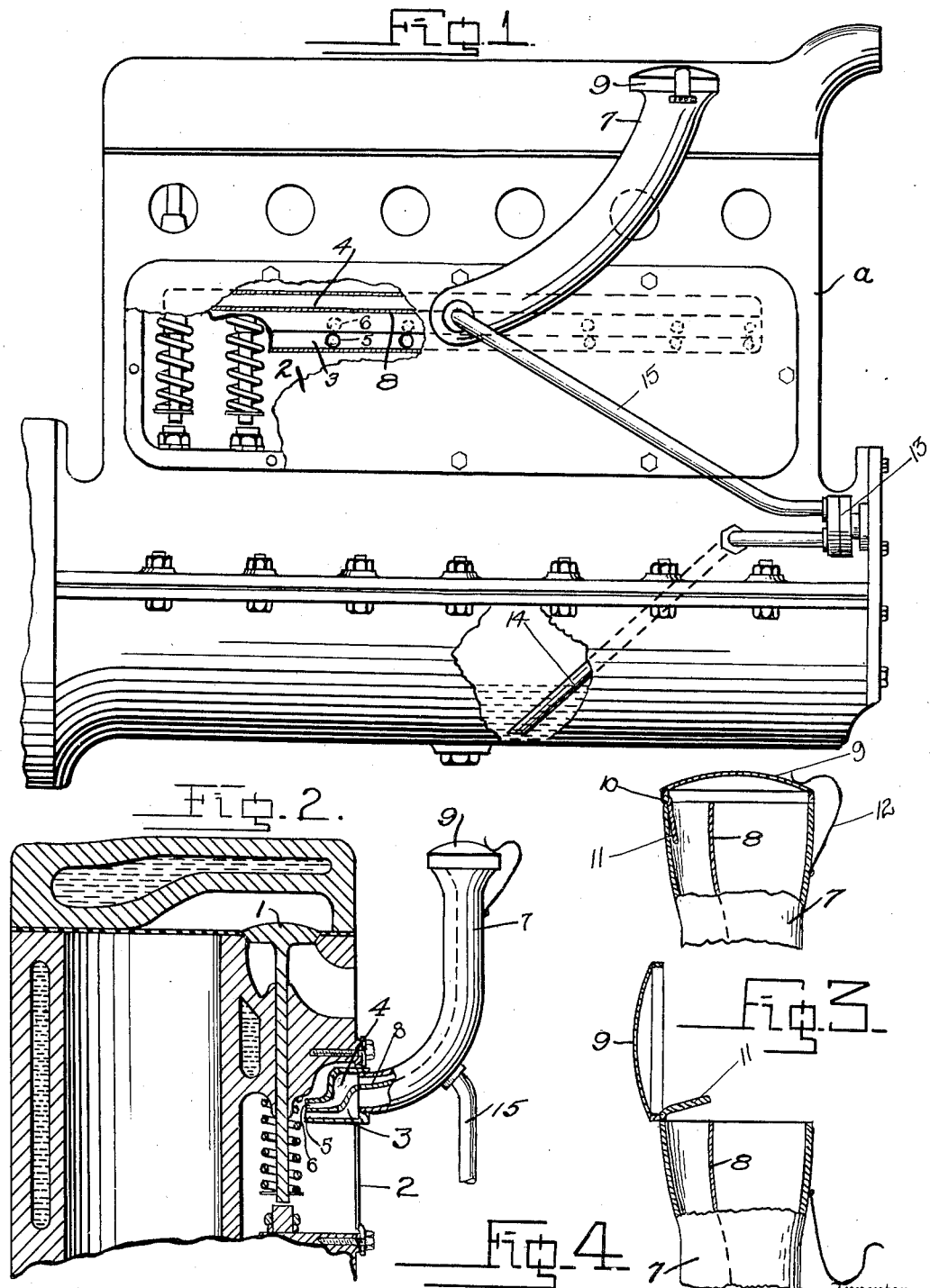

1,916,248

UNITED STATES PATENT OFFICE

GEORGE A. BARKER, OF ROCHESTER, NEW YORK

LUBRICATOR

Application filed November 23, 1931. Serial No. 576,798.

(GRANTED UNDER THE ACT OF MARCH 3, 1883, AS AMENDED APRIL 30, 1928; 370 O. G. 757)

This invention described herein may be manufactured and used by or for the Government for governmental purposes, without the payment to me of any royalty thereon.

This invention relates to engines, but more particularly to an arrangement for cleaning and lubricating the stems of engine valves of the poppet type.

One object of my invention is to prevent sticking of the valves in an engine.

A second object is to provide efficient cleaning and lubricating of the valve stems.

A third object is to furnish a construction whereby lubricant vapors from the engine will be constrained to pass over the valve stems.

A fourth object is to provide a construction whereby the valve stems will be lubricated both by vaporous and liquid lubricant.

A final object is to furnish an inexpensive and readily adapted mechanical device for effecting the above mentioned objects.

The only lubrication the valves in the conventional L-head engine obtain is that produced by splashing of the oil from the crank case, by oil thrown off through the rotation of the crank shaft, or by oil mist from the ensemble. This oil is generally heated and of poor lubricating quality. The only efficient oiling of the valve stems is obtained when the engine is overhauled or the valves are ground.

It is the purpose of this invention to provide means whereby the valve stems may not only be more frequently supplied with clean lubricant but also, when desired, furnished with a cleaning fluid which will operate to remove from the valve stems sticky lubricating material and lubricant residues which have a tendency to cause freezing or faulty operation of the valve, and also take advantage of the lubricating qualities of the lubricant vapors from the engine by causing the same to be positively brought into contact with the valve stems.

To accomplish this purpose I incorporate into the valve spring cover a lubricant reservoir and a lubricant vapor chamber, the former provided with nozzles and the latter with orifices in the immediate proximity of the valve stems. The reservoir and chamber communicate through a breather pipe with the atmosphere, the breather pipe provided with a septum designed to permit the introduction of lubricant to the reservoir but preclude egress thereof to the chamber. If desired an oil pump associated with the engine crank case may be operated to maintain a constant flow of lubricant through the reservoir.

In order that the invention may be more readily understood reference is had to the accompanying drawing forming a part of the specification and in which—

Fig. 1 represents an engine in side elevation with the invention applied thereto;

Fig. 2 is a sectional fragment showing an end section of the invention;

Figs. 3 and 4 show the closure for the breather pipe.

An engine broadly designated by $a$ is provided with poppet valves (1) controlling the events of the engine cycle. A valve spring cover (2) is so constructed as to incorporate therein a lubricant reservoir (3) and a lubricant vapor chamber (4), the reservoir having nozzles (5) and the chamber provided with orifices (6). Both the nozzles and the orifices are in number equal to the number of valve stems and each pair, a nozzle and an orifice constituting a pair, is positioned in the immediate vicinity of the stems of the valves. In practice each pair is positioned in the axial plane of the valve stem with which said pair is associated, the nozzle and orifice of each pair substantially radially directed toward the stem. Communicating with the reservoir and chamber is a breather pipe (7) provided with a septum (8) intended to isolate the reservoir and chamber but at the same time permit access to each through the breather pipe.

The breather pipe (7) is fitted with a closure (9) hinged as at (10) and carries, depending in the neighborhood of the hinge, a projection (11). When the breather pipe is closed, projection (11) lies along side its wall but when the breather pipe is opened through raising the closure about its hinge, the projection (11) is designed to lift and block off access to that portion of the breather pipe communicating with the chamber.

It is obvious that with this construction, when introducing lubricant or cleaning fluid to the reservoir, that the same will be precluded from entering into the chamber. The closure is maintained in position through the intermediary of a conventional catch (12).

For the purpose of continually circulating lubricant through the reservoir, a pump (13) may be affixed at a convenient point on the engine and actuated in any manner seen fit. The pump draws lubricant from the crank case through connection (14) and forces it by way of conduit (15) into that portion of the breather pipe which is associated with the reservoir.

Having thus described the details of my device, the operation may be set forth as follows:

At such times as it may seem proper to do so lubricant may be drained from the engine and a cleaning fluid introduced into the breather pipe and passed to the reservoir and thence through the nozzles over the stems of the valves to the crank case. After withdrawal of the cleaning fluid from the crank case, new lubricant may be introduced to the engine over the same path and this, impinging upon the valve stems, provides them with a positive lubricant which has the effect of precluding their faulty operation, this lubricant thereafter passing to the crank case. It is obvious that the nozzles may be made of such size as to retard or accelerate the emptying of the reservoir and as a result provide a lubricant for the valve stems over a greater or lesser period of time.

When the lubricant reservoir is filled, lubricant vapors arising from the engine are constrained to enter the orifices into the chamber and since these orifices are positioned in such a manner as to cause the vapors to pass over the stems of the valves, the vapors in their egress through the breather pipe lend what lubricating qualities they possess to their stems. After the reservoir is empty it is manifest that lubricant vapors may egress over the valve stems through both the nozzles and the orifices but in any event, due to the position of the said openings, the vapors are forced to pass over the stems of the valves.

In the event that a constant circulation of lubricant through the reservoir and over the valve stems is desired, the oil pump may be incorporated. Obviously when the pump is utilized, since lubricant is constantly projected onto the valve stems, the vaporous lubrication phase becomes of minor importance and the orifices and chamber operate only as a path to the atmosphere for the vapors.

It is to be understood that the above described constructions are only exemplary and may be replaced by mechanical equivalents without departing from the scope of the invention. That is to say, by this invention there is produced a system of engine lubrication, or lubrication of a machine, wherein primarily there is a reciprocable member such as the valve stem to be lubricated, the supply of all of the lubricant being through the chamber surrounding a portion of the reciprocable member. In the particular embodiment of the invention illustrated, the valve stem extends downwardly into a chamber which is closed by the cover plate 2, and the combination filler and breather pipe 7 carried by the plate has its lower end terminating in the lubricant reservoir 3, and the vapor chamber 4, the lubricant reservoir and the vapor chamber each extending across the plurality of valve stems or reciprocable members. The reservoir and vapor chamber are provided, opposite each reciprocable member, with a bi-compartment conduit or nozzle, the compartments or passages of which communicate with the said reservoir and vapor chamber, and this nozzle or conduit is so disposed as to have its terminals extend in a direction substantially radial with respect to the reciprocable member, wherefore the lubricant is caused to be jetted or positively directed in a radial line against and onto the reciprocable member, and the vapors of the chamber into which the reciprocable member extends are caused to travel transversely across the reciprocable member to reach the vapor chamber 4 and thereby gain the breather passage in the filler pipe 7.

Referring particularly to Figure 2 of the drawing it will be readily seen that the lubricant reservoir 3 contains lubricant, and also there will be a liquid lubricant in the lower end of the filler pipe 7, and when the pump 13 is employed, this liquid lubricant will fill said filler pipe up to the juncture thereof with the pipe 15 leading to the pump. Consequently, it is intended that the chamber surrounding the portion of the valve stem, in the case of the automobile engine, or the reciprocable member of any machine, shall have therein an appreciable amount of liquid lubricant, which amount is supplied through the filler pipe 7 and will ultimately drain into the engine sump, of the engine, or a suitable container therefor provided in the case of a machine.

Having described my invention what I claim as new and wish to secure by Letters Patent is:

1. In an engine provided with poppet valves, means for jetting a liquid lubricant on the stems of the valves and means for transversely passing lubricant vapors from the engine over the stems of the valves.

2. In an engine provided with poppet valves, a lubricant reservoir, a chamber and means for passing lubricant from the reservoir to the stems of the valves and withdrawing lubricant vapors from the engine to the chamber over the stems of the valves.

3. In an engine provided with poppet valves, a valve spring cover carrying a lubricant reservoir and a chamber, nozzles in the reservoir and orifices in the chamber, both nozzles and orifices immediately adjacent the valve stems, and means to introduce lubricant to the reservoir and means to permit lubricant vapors to pass from the chamber.

4. In an engine provided with poppet valves, a valve spring cover and means carried thereby and arranged substantially in the axial plane of the stems of said valves for permitting lubricant vapors to pass over said stems.

5. In an engine provided with poppet valves, a valve spring cover, a chamber formed on said cover, and means carried by said cover and arranged substantially in the axial plane of the stems of said valves and directed transversely toward said stems for permitting lubricant vapors to pass over said stems, and from the chambers.

6. In an engine provided with poppet valves, a valve spring cover, means carried by said cover for directing a liquid lubricant against the stems of said poppet valves, and means for transversely passing lubricant vapors from the engine over the stems of the valves.

7. In an engine provided with poppet valves, a valve spring cover, a chamber and a reservoir juxtaposed carried by said cover, means for directing lubricant from the reservoir against the stems of the valves, and means for passing lubricant vapors across said stems into said chamber.

8. In an engine of the L-head poppet valve type provided with a valve the combination of a valve spring cover for said valve; and a combined filler and breather pipe discharging through said cover, said pipe for supplying lubricant to said engine.

9. For an engine provided with a valve, a valve spring cover having two compartments, one for liquid lubricant and the other for lubricant vapor; and a conduit having two separate passages communicating with said compartments, said conduit extending from said cover radially with respect to the stem of said valve for lubricating the latter.

10. For an engine provided with a valve, a valve spring cover having two compartments, one for liquid lubricant and the other for lubricant vapor; and a conduit having two separate passages communicating with said compartments, said conduit discharging radially with respect to the stem of said valve for lubricating the latter.

11. For an engine provided with a valve, a valve spring cover having two compartments, one for liquid lubricant and the other for lubricant vapor; and a conduit having two separate passages communicating with said compartments, said conduit having its free end directed radially with respect to the stem of said valve for lubricating the latter.

12. In a system of lubrication the combination of a reciprocable member to be lubricated; a chamber surrounding a portion of said member; a cover plate closing said chamber; and dual conduits carried by said plate, one conveying lubricant to said member and the other for removing vapors from said chamber.

13. In a system of lubrication the combination of a reciprocable member to be lubricated; a chamber surrounding a portion of said member; a cover plate closing said chamber; and dual conduits carried by said plate, one conveying lubricant to said member and the other for removing vapors from said chamber, the terminals of said conduits substantially radially disposed with respect to said member.

14. In a system of lubrication the combination of a reciprocable member to be lubricated; a chamber surrounding a portion of said member; a cover plate closing said chamber; and a nozzle having dual conduits carried by said plate, one conduit conveying lubricant to said member and the other for removing vapors from said chamber.

15. In a system of lubrication the combination of a plurality of reciprocable members to be lubricated; a chamber surrounding a portion of said members; a cover closing said chamber, said cover carrying a lubricant reservoir as well as a vapor chamber; and a bi-compartment conduit opposite each member and communicating with said reservoir and said vapor chamber for lubricating said members, and removing vapors from said chamber.

16. In a system of lubrication the combination of a plurality of reciprocable members to be lubricated; a chamber surrounding a portion of said members; a cover closing said chamber, said cover carrying a lubricant reservoir as well as a vapor chamber, the reservoir and the vapor chamber each extending across all of said members; and a bi-compartment conduit extending substantially radially toward each member and communicating with said reservoir and said vapor chamber for lubricating said members, and removing vapors from said chamber.

17. In an internal combustion engine of the L head poppet valve type the combination of a valve spring chamber; a lubricant reservoir in said chamber; a valve spring cover closing said chamber; and a filler conduit for supplying lubricant to said engine, said conduit discharging through said cover.

18. In an engine embodying poppet valves, a carried by said plate, and nozzles leading from the reservoir transversely toward the stems of the valves for jetting lubricant from said reservoir onto the stems of the valves.

19. In an internal combustion engine of the L-head poppet valve type, the combination of a valve spring chamber, a cover extending across said chamber and forming a wall of said chamber and a filler conduit for supplying lubricant to said engine through said chamber.

20. In an internal combustion engine of the L-head poppet valve type, the combination of a valve spring chamber, a lubricant reservoir associated with said chamber and a filler conduit for supplying lubricant to said reservoir and over the valve lifting assembly within said chamber and thence to the engine sump.

21. In an engine of the L-head type embodying poppet valves, a valve spring cover, a filler pipe and a lubricant reservoir attached to said cover and means for directing lubricant from said reservoir onto the stems of said valves and to said engine sump.

22. In an L-head engine having poppet valves and a chamber enclosing the stems and springs of said valves; the combination of an enclosing cover for said stem and springs and a filler pipe communicating with said chamber, said pipe passing through and supported by the valve spring cover and adapted to supply lubricant to the engine through said chamber.

GEORGE A. BARKER.